United States Patent [19]
Gilby et al.

[11] 3,735,565
[45] May 29, 1973

[54] ENRICHMENT OF CHROMATOGRAPH OUTPUT

[75] Inventors: Anthony C. Gilby, Darien; John P. Gaglione, Stratford, both of Conn.

[73] Assignee: Wilks Scientific Corporation, Norwalk, Conn.

[22] Filed: May 6, 1971

[21] Appl. No.: 140,758

[52] U.S. Cl. .................................55/197, 73/23.1
[51] Int. Cl. .............................................B01d 15/08
[58] Field of Search.....................55/67, 197, 208, 55/217, 386; 73/23.1

[56] References Cited

UNITED STATES PATENTS

| | | |
|---|---|---|
| 3,462,918 | 8/1969 | Prosser....................................55/67 |
| 3,357,157 | 12/1967 | O'Donnell..............................55/67 X |
| 3,225,520 | 12/1965 | Burow.......................................55/67 |
| 3,527,567 | 9/1970 | Philyaw et al. .........................55/67 X |

*Primary Examiner*—John Adee
*Attorney*—Buckles and Bramblett

[57] ABSTRACT

There is disclosed method and apparatus for enriching the concentration of one component eluting from a gas chromatograph by the substantial elimination of carrier gas therefrom. This is accomplished by passing the desired component through a cooled zone where it is condensed while the carrier gas continues to flow. When the component has been collected, the formerly cooled zone is heated to revaporize the component, permitting it to be flushed into a subsequent sample chamber, such as that of a spectrophotometer.

8 Claims, 9 Drawing Figures

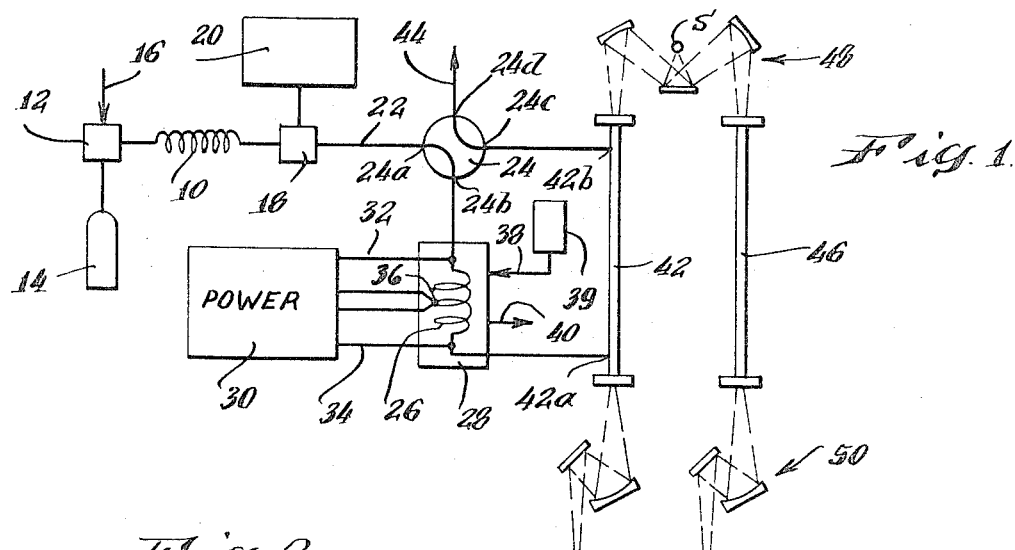
Fig. 1.
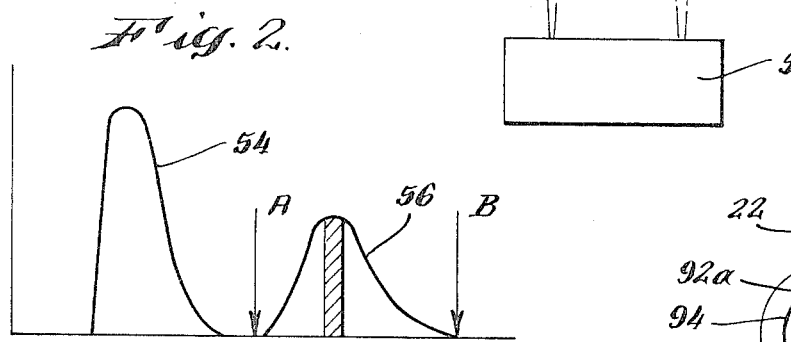
Fig. 2.
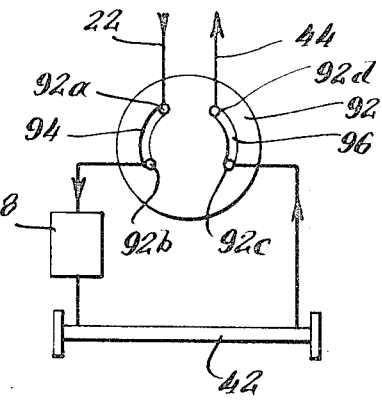
Fig. 3.
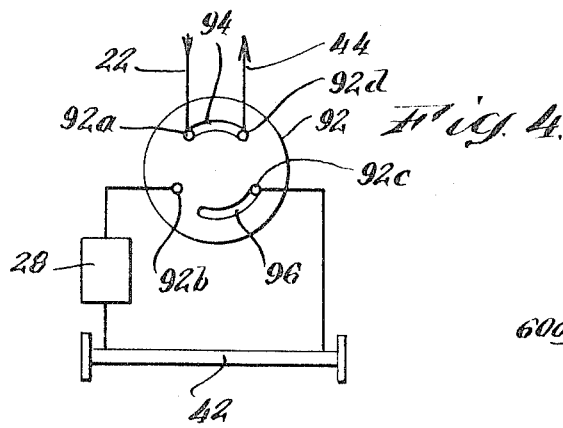
Fig. 4.
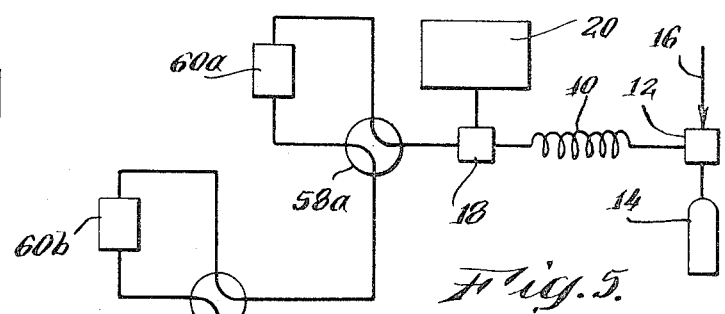
Fig. 5.
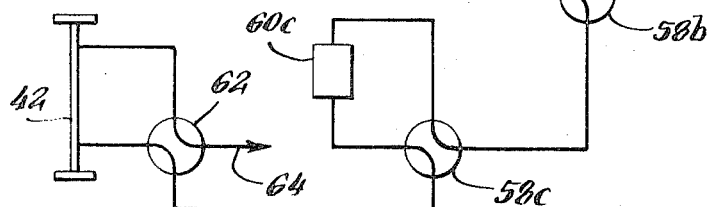

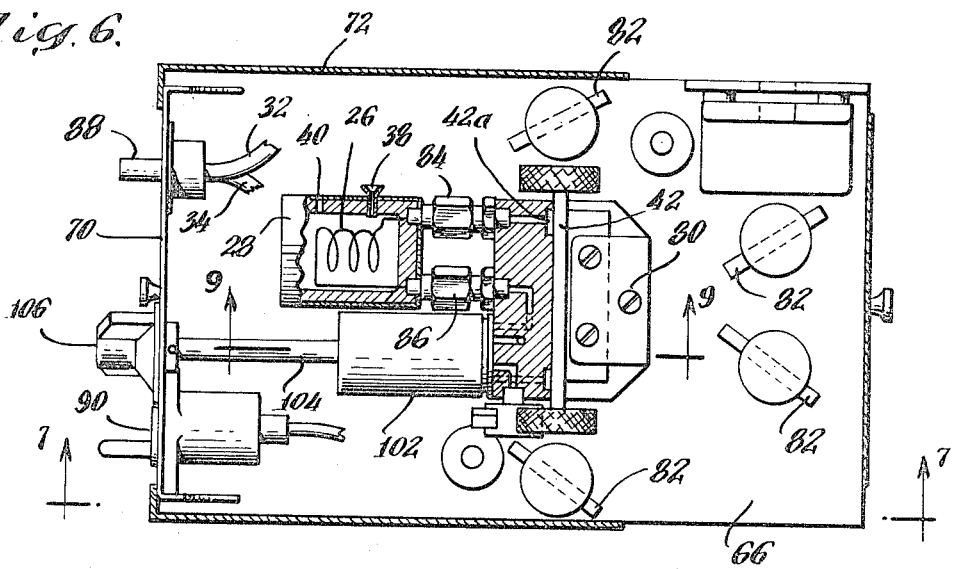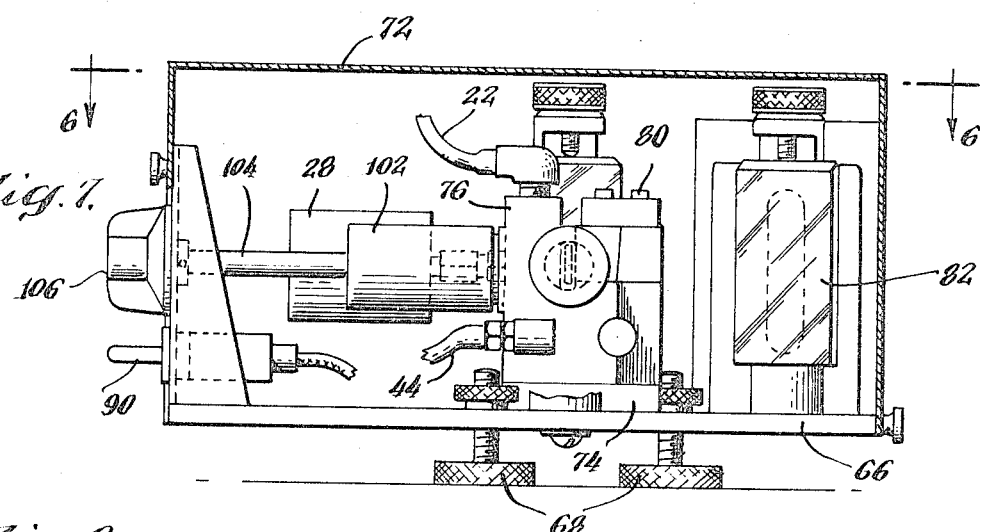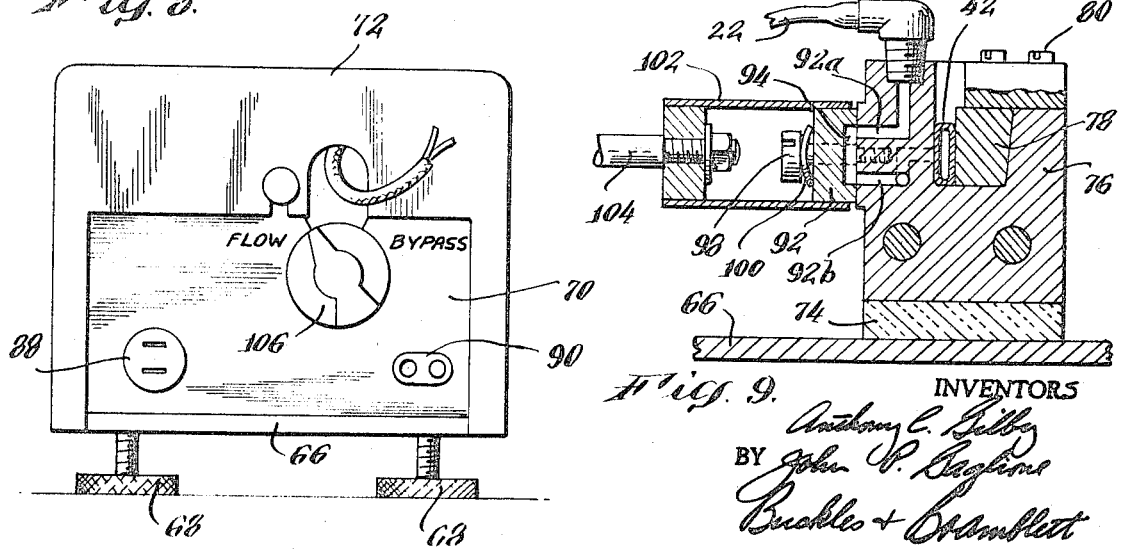

ENRICHMENT OF CHROMATOGRAPH OUTPUT

BACKGROUND OF THE INVENTION

Gas chromatography is an extremely sensitive method for separating and quantitatively analyzing the components of a vaporized mixture. It can, for example, separate a mixture in which individual components are present in amounts too small to detect using a conventional infrared spectrometer. Difficulties in making infrared analyses increase rapidly for sample weights below approximately 10 to 50 $\mu$g. On the other hand, an open tubular chromatographic column 0.01 inch in diameter is fully loaded by a 5 $\mu$g injection of a mixture.

It will be seen from the foregoing that there are inherent difficulties in combining the separating function of a gas chromatograph with the qualitative analysis capabilities of an instrument such as a spectrometer. A component elutes from a chromatographic column in relatively slow fashion forming a peak. This is particularly true of high boiling components which typically result in broad chromatographic peaks of low concentration in carrier gas. Accordingly, if the output from a chromatographic column is simply directed into the sample cell of a spectrometer, it is quite difficult, if not impossible, to trap an entire chromatographic peak therein. Instead, there is obtained a relatively small fraction of the component, substantially diluted with the carrier. Accordingly, it would be desirable to increase the enrichment of a sample component relative to the carrier gas and to eliminate the carrier gas to the maximum possible extent for spectrometric analysis.

There have been other more or less successful prior art attempts to combine gas chromatography with other analytical techniques. However, these are not suitable for combining gas chromatography with spectrometry. For example, there have been gas chromatography-mass spectrometry systems which have successfully used helium separators based on the high rate of diffusion of helium relative to the heavier sample molecules. The enrichment is proportional to the square root of the molecular weight ratio. Therefore, the system works best for heavy sample molecules but sample is inevitably lost during the enrichment process. Mass spectrometry is a highly sensitive technique and loss of some of the sample is not usually a problem.

There are also selective diffusion techniques wherein certain organic molecules permeate a membrane which holds back the carrier gas. However, these techniques are applicable only to specific classes of sample molecules. Lovelock et al. described a palladium silver alloy "transmodulator" in 41 *Analytical Chemistry* 1048(1969). Unfortunately, however, some compounds would be hydrogenated in the presence of hydrogen at a heated active palladium surface. This would make subsequent infrared analysis uncertain.

Accordingly, it is the primary object of the present invention to provide method and apparatus for enriching a selected sample component eluting from a gas chromatograph. Other objects are to provide such method and apparatus for substantially eliminating carrier gas from such component; for injecting substantially all such component into the sample cell of a spectrometer or other analytical instrument; and for selectively enriching any number of such components.

SUMMARY OF THE INVENTION

A method for chemical analysis of a multicomponent vapor sample wherein the vapor sample and a carrier gas stream are passed through a chromatographic column. At least one component from said column is removed as a binary mixture with the carrier gas stream. The binary mixture is passed through an enrichment zone which is cooled to condense the component therein. The remaining carrier gas and components are bypassed around the enrichment zone. Thereafter, the enrichment zone is heated to vaporize the component and the revaporized component is passed into an analyzer where it is analyzed.

BRIEF DESCRIPTION OF THE DRAWINGS

FIG. 1 is a schematic diagram illustrating the apparatus of this invention connected between the output of a chromatographic column and the sampling portion of a spectrometer;

FIG. 2 is a diagram useful in understanding the invention;

FIG. 3 is a diagram of a valving system usable in the present invention;

FIG. 4 is an illustration similar to FIG. 3 showing the valve in a different position;

FIG. 5 is a schematic diagram of a modified form of this invention;

FIG. 6 is a top view of a spectrometer accessory including this invention, taken substantially along the line 6—6 of FIG. 7;

FIG. 7 is an elevational view of the accessory of FIG. 6 taken substantially along the line 7—7 of FIG. 6;

FIG. 8 is a front view of the accessory of FIGS. 6 and 7; and

FIG. 9 is an enlarged view taken substantially along the line 9—9 of FIG. 6.

DESCRIPTION OF THE PREFERRED EMBODIMENTS

In FIG. 1 there is illustrated one form of the invention including a chromatographic column 10 having an inlet 12 for receiving carrier gas from a suitable source 14 and sample injection means 16. The column outlet is connected to a suitable detector 18 controlling a recorder 20. Column 10 will normally be heated, or even temperature programmed, to maintain the sample in vaporized form. A heated transfer line 22 transfers the column effluent to the inlet port 24a of a four port two position valve 24. The remaining ports of valve 24 are identified by the letters b, c, and d. Port 24b is connected to the inlet of a coiled receiving tube 26 housed within an insulated enclosure 28. A temperature controlled power supply 30 has its output leads 32, 34 connected to the opposite ends of the receiving tube 26 to pass a heating current therethrough, the temperature control being provided by a thermocouple 36 connected at approximately the midpoint of receiving tube 26. Enclosure 28 is provided with refrigerant inlet means 38 and exhaust 40. Refrigerant may be introduced from a suitable supply 39. The output end of receiving tube 26 is connected to the inlet port 42a of a light pipe 42. The outlet 42b of the light pipe is connected to valve port 24c and valve port 24d is connected to a suitable vent 44.

Light pipe 42 comprises the sample cell of a conventional spectrophotometer accessory for analyzing the output of the gas chromatograph. In the illustrated embodiment, the spectrophotometer is of the dual beam type and includes a reference light pipe 46. These light pipes are in the form of substantially rectangular elongated chambers having highly polished internal surfaces with windows and slits at each end. Radiation from a source S is focused by the source optics 48 to pass through the reference and sample pipes, respectively, and receiving optics 50 refocus the beams to enter the usual monochromator 52.

The operation of the apparatus of FIG. 1 may be best understood by further reference to FIG. 2 which illustrates two chromatographic peaks 54, 56, such as might be recorded by recorder 20. For purposes of illustration, assume that it is desired to further analyze the component forming peak 56 in the infrared spectrophotometer. Valve 24 is first rotated 90° to interconnect ports 24a and 24d. The valve remains in this position during the time of elution of peak 54, thereby causing that component to be vented from vent 44. It will be noted that peak 56 is of relatively long duration (from time A to time B) and is also of low concentration, indicating a substantial amount of carrier gas.

In accordance with the prior art, which did not include the receiving tube 26, it was necessary to watch the recorder until the peak of component 56 was obtained, whereupon the valve was switched to the illustrated position. The component and carrier gas would then flow into light pipe 42 whereupon valve 24 would be returned to its original position, allowing successive components to vent. Spectrometric analysis would then be run on the sample contained in light pipe 42. This sample is represented by the shaded area of component 56 and will be seen to be, not only a small amount of the total component, but of low concentration, being admixed with a considerable amount of carrier gas.

In accordance with the present invention peak 54 is vented as heretofore explained but valve 24 is thereafter rotated to its illustrated position at time A. A small quantity of a suitable refrigerant, such as a commercially available low boiling hydrocarbon, is injected into refrigerant inlet 38. This chills the receiving tube 26 and the component of interest is condensed and trapped therein in liquid or solid form while the carrier gas continues to flow through light pipe 42. By time B, all of the component will be contained in enriched form within receiving tube 26 and power supply 30 is then actuated to pass heating current through receiving tube 26. The temperature of the tube is monitored by thermocouple 36 which controls the heating current flow. The consequent heating of tube 26 revaporizes the component of interest which is then flushed in its entirety into light pipe 42. The valve 24 is then rotated 90° to isolate the light pipe and vent further components. Light pipe 42 will thereupon contain the component of interest in enriched form with very little carrier gas present.

In the foregoing example, all peaks eluted during the period of spectrographic analysis were vented. This can be avoided, if desired, by stopping the flow of carrier gas through the column 10 while a spectrum is being run. It has been determined that stop-start operation of a chromatograph results in very little deterioration in sample resolution.

In FIG. 5 there is illustrated a modified form of the apparatus of FIG. 1 wherein the output from detector 18 is passed sequentially through selector valves 58a – c, each of which is provided with a separate enclosure 60a – c of the type previously disclosed. A bypass valve 62 is provided to admit the component into light pipe 42 or directly to vent 64. By means of this modification, the output of the chromatographic column may be directed to one enclosure after another as the peaks are eluted. Each enclosure would be cooled before use and its ends sealed afterwards by the appropriate valve 58. Thus, several components could be stored in concentrated form and, after revaporizing, could be flushed into the light pipe 42 for analysis.

In FIGS. 6 – 9 there is illustrated an actual accessory incorporating this invention. In many respects, this accessory is similar to that illustrated diagrammatically in FIG. 1. However, it is designed to be inserted into the sample space of a conventional single beam spectrophotometer. Accordingly, it is designed with only one light pipe. The accessory comprises a base 66 mounted on adjustable feet 68. The base is provided with a front panel 70 and the entire assembly is enclosed by a removable housing 72. Mounted on base 66, upon an insulated spacer 74, is a heated mounting block 76. The mounting block 76 defines a recess within which is positioned light pipe 42, secured therein by means of a locking wedge 78 and clamping screw 80. Also mounted upon base 66 are a plurality of mirrors 82 positioned to receive radiation from the source side of the spectrophotometer and focus and redirect it through light pipe 42 into the monochromator portion of the spectrophotometer. These features are conventional and it is not believed necessary to describe them in any further detail.

Throughout the following description, reference numerals similar to those used in FIG. 1 will be employed to simplify the description. Mounted on the front of block 76 by means of suitable fittings 84, 86 is the receiving tube 26 mounted in insulated enclosure 28. In the illustrated embodiment, receiving tube 26 comprises a 0.020 inch support-coated tubular column having a length of approximately 3 inches. Its ends are electrically connected to the leads 32, 34 of the power supply which may be connected to plug 88. The actual electrical connections are omitted from the drawings in order to simplify the showing. A thermocouple is connected to the receiving tube 26 to monitor its temperature and it, in turn, is connected to the power supply by means of a thermocouple connector 90. Means for refrigerating the enclosure 28 are provided by a refrigerant inlet 38, which may be adapted to receive the nozzle or tube extending from a conventional refrigerant container, and a refrigerant exhaust port 40.

The valve for this embodiment is provided by a teflon coated portion of the front surface of mounting block 76 which defines four ports 92a – d against which is mounted a steel valve disc 92. Internal passages within mounting block 76 extend between the inlet 22, outlet 44, enclosure 28, light pipe 42, and the valve ports. In order to simplify the showing, the valve is illustrated diagrammatically in FIGS. 3 and 4 wherein it will be noted that the valve disc 92 is provided with arcuate recesses 94, 96. Valve disc 92 is mounted by means of a bolt 98 and spring 100 and is controlled through a coupling member 102 and shaft 104 by an external knob 106. Knob 106 has a "Flow" position which permits a component to pass through enclosure 28 and light pipe 42 and a "Bypass" position which passes effluent from transfer line 22 directly to the vent 44. FIG. 3 illustrates the valve in its "Flow" position, and FIG. 4 illustrates its "Bypass" position wherein the light pipe 42 and enclosure 28 are isolated from the remainder of the system.

While a number of variations are possible in this invention, one specific example employed a chromatograph comprising a 5 foot by ⅛ inch column with carbowax 1540. The receiving tube 26 was a 3 inch coil or support-coated column 0.020 inch inside diameter, giving a volume of approximately $1.5 \times 10^{-2}$ ccs. This is roughly the volume of 30 $\mu$g of a component of molecular weight 100 at 200° C and atmospheric pressure. A conventional light pipe may have a cross section of 1.5 × 6.7 mm and be 6 cm in length, giving a volume of 0.6ccs. As 10 – 50 $\mu$g of material is required for infrared analysis, this invention is usable for all sizes of packed columns and the widest (0.03 inch) open tubular columns which have a maximum loading of 250 $\mu$g.

It is believed that the many advantages of this invention will be apparent to those skilled in the art. It will also be apparent that many variations and modifications may be made therein without departing from its spirit and scope. Accordingly, the foregoing description is to be considered as illustrative only, rather than limiting. This invention is limited only by the scope of the following claims.

What is claimed is:

1. Apparatus for the chemical analysis of a multicomponent vapor which comprises: a chromatographic column having a inlet and an outlet; a source of carrier gas; means for passing said carrier gas through said column from its inlet to its outlet; means for injecting said sample into the inlet of said column; means for detecting the elution of components of said sample from said column; an insulated housing; electrically conductive tubing within said housing for receiving said component; means for selectively cooling said tubing to condense said component therein; means for bypassing remaining carrier gas and components around said tubing; an electrical power source connected to pass an electrical current through said tubing to selectively heat said tubing to vaporize said component; and means for analyzing said revaporized component.

2. The apparatus of claim 1 wherein said analyzing means comprises a spectrophotometer including a sample cell connected to receive said revaporized component.

3. An accessory for analyzing the output from a chromatograph in a spectrophotometer which comprises: a base positionable in the sample region of a spectrophotometer between the source region and the monochromator region; a sample cell defining radiation inlet and exit windows and sample inlet and outlet ports; means for mounting said sample cell on said base; means mounted on said base for directing radiation from said source region through said sample cell and into said monochromator region; an insulated enclosure; a sample enrichment tube within said enclosure having an outlet end connected to said sample inlet port and an inlet end; and means for selectively passing the output from said chromatograph either sequentially through said enrichment tube and sample cell, or bypassing said output around said enrichment tube and sample cell.

4. The accessory of claim 3 wherein said sample enrichment tube is electrically heatable for vaporizing components of said chromatograph output trapped therein.

5. The accessory of claim 3 wherein the means for mounting the sample cell comprises: a mounting block secured to said base; and means for selectively clamping said sample cell to said mounting block.

6. The accessory of claim 3 wherein the means for selectively passing the output from the chromatograph comprises a selector valve connected to the inlet end of the enrichment tube to receive the output from said chromatograph and having a first position for passing the output sequentially through said enrichment tube and sample cell and a second position for bypassing the output around the enrichment tube and sample tube.

7. The accessory of claim 4 wherein the means for mounting the sample cell comprises: a mounting block secured to said base; and means for selectively clamping said sample cell to said mounting block.

8. The accessory of claim 7 wherein the means for selectively passing the output from the chromatograph comprises a selector valve connected to the inlet end of the enrichment tube to receive the output from said chromatograph and having a first position for passing the output sequentially through said enrichment tube and sample cell and a second position for bypassing the output around the enrichment tube and sample cell.

* * * * *